Dec. 10, 1963   E. R. ANDERSON   3,113,601
PITTING MACHINE
Filed March 20, 1959   7 Sheets-Sheet 2
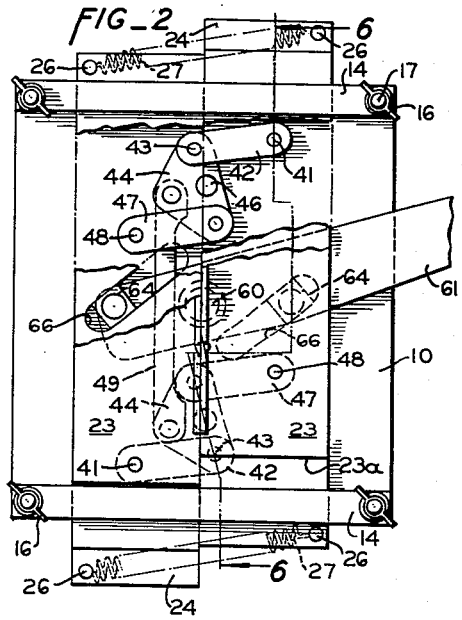
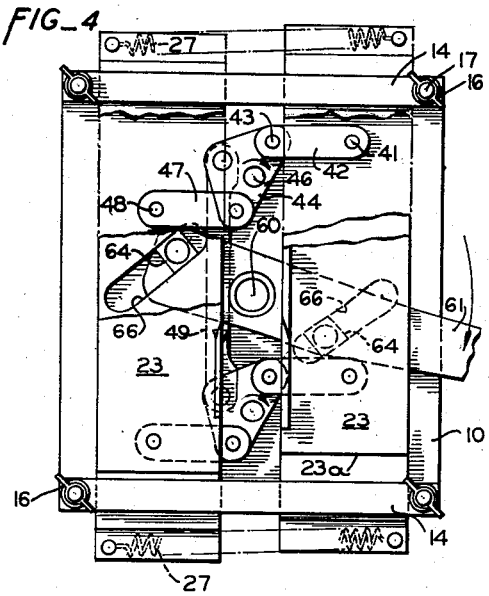
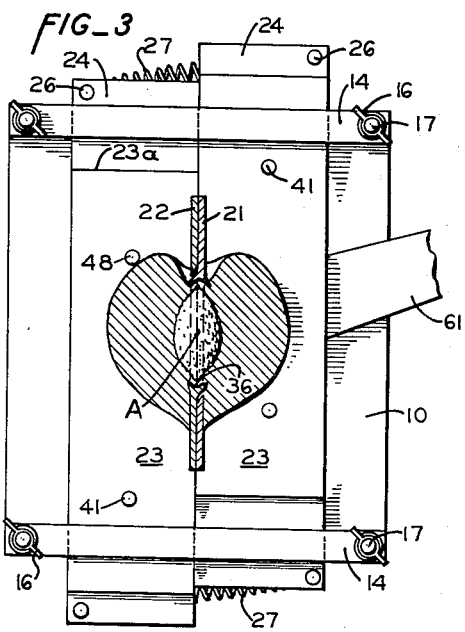
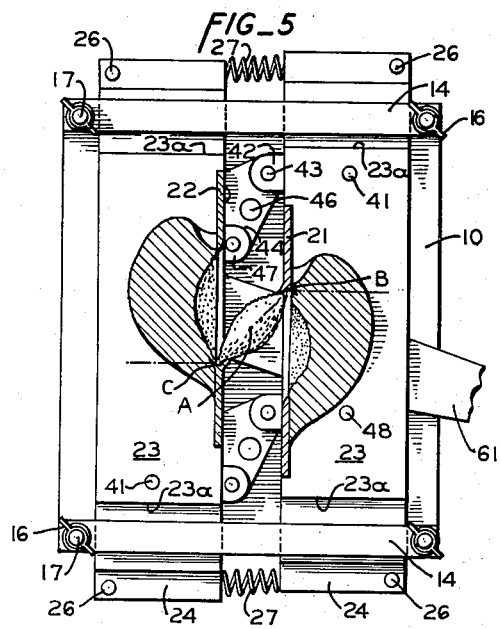
INVENTOR.
EARL R. ANDERSON
BY
ATTORNEY Dec. 10, 1963 E. R. ANDERSON 3,113,601
PITTING MACHINE
Filed March 20, 1959 7 Sheets-Sheet 3
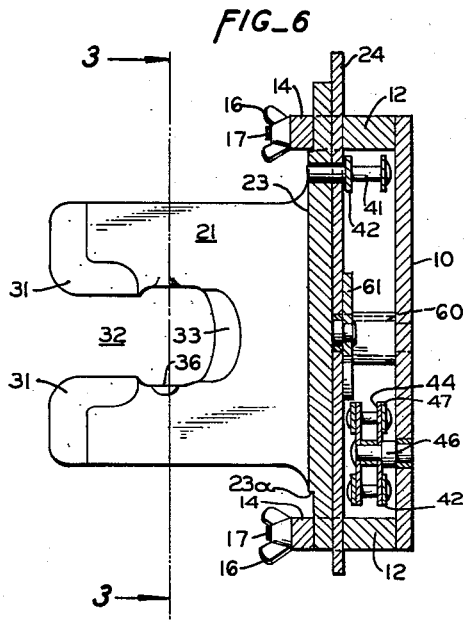
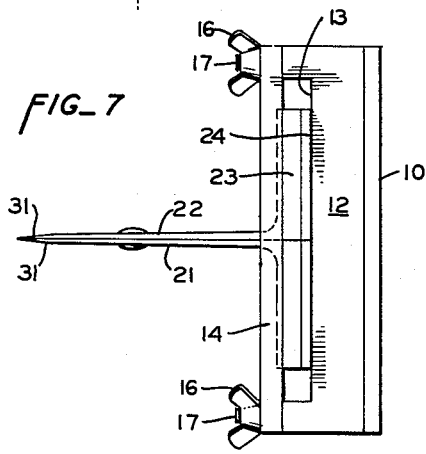
INVENTOR.
EARL R. ANDERSON
BY
*Harper Allen*
ATTORNEY Dec. 10, 1963  E. R. ANDERSON  3,113,601
PITTING MACHINE
Filed March 20, 1959  7 Sheets-Sheet 4
FIG_8
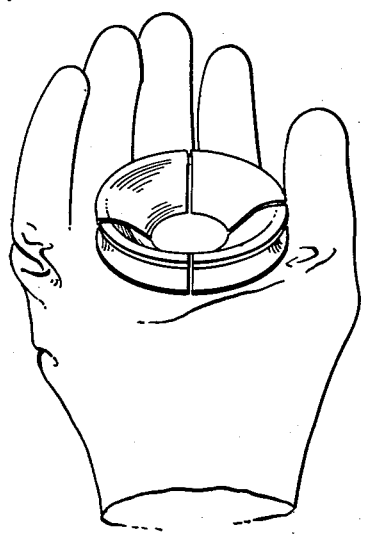
FIG_9
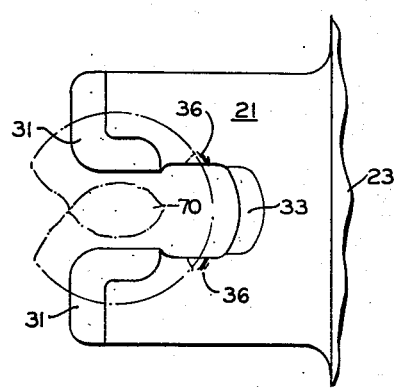
FIG_10
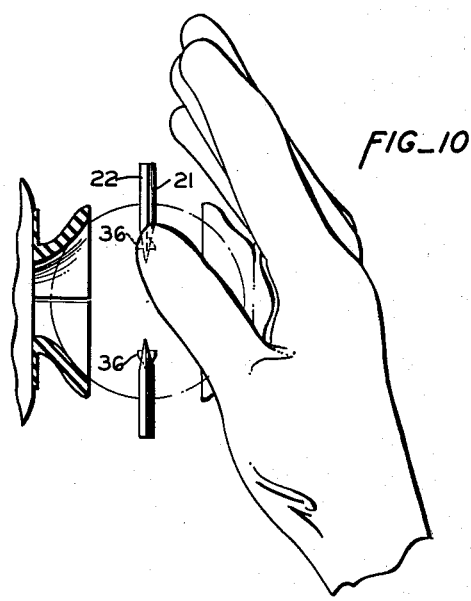
FIG_11
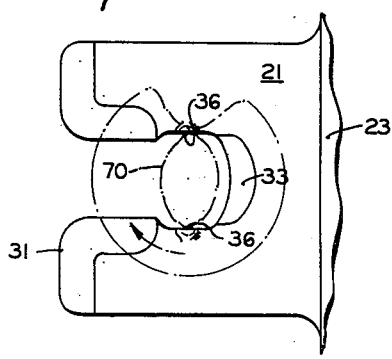
INVENTOR.
EARL R. ANDERSON
BY
ATTORNEY

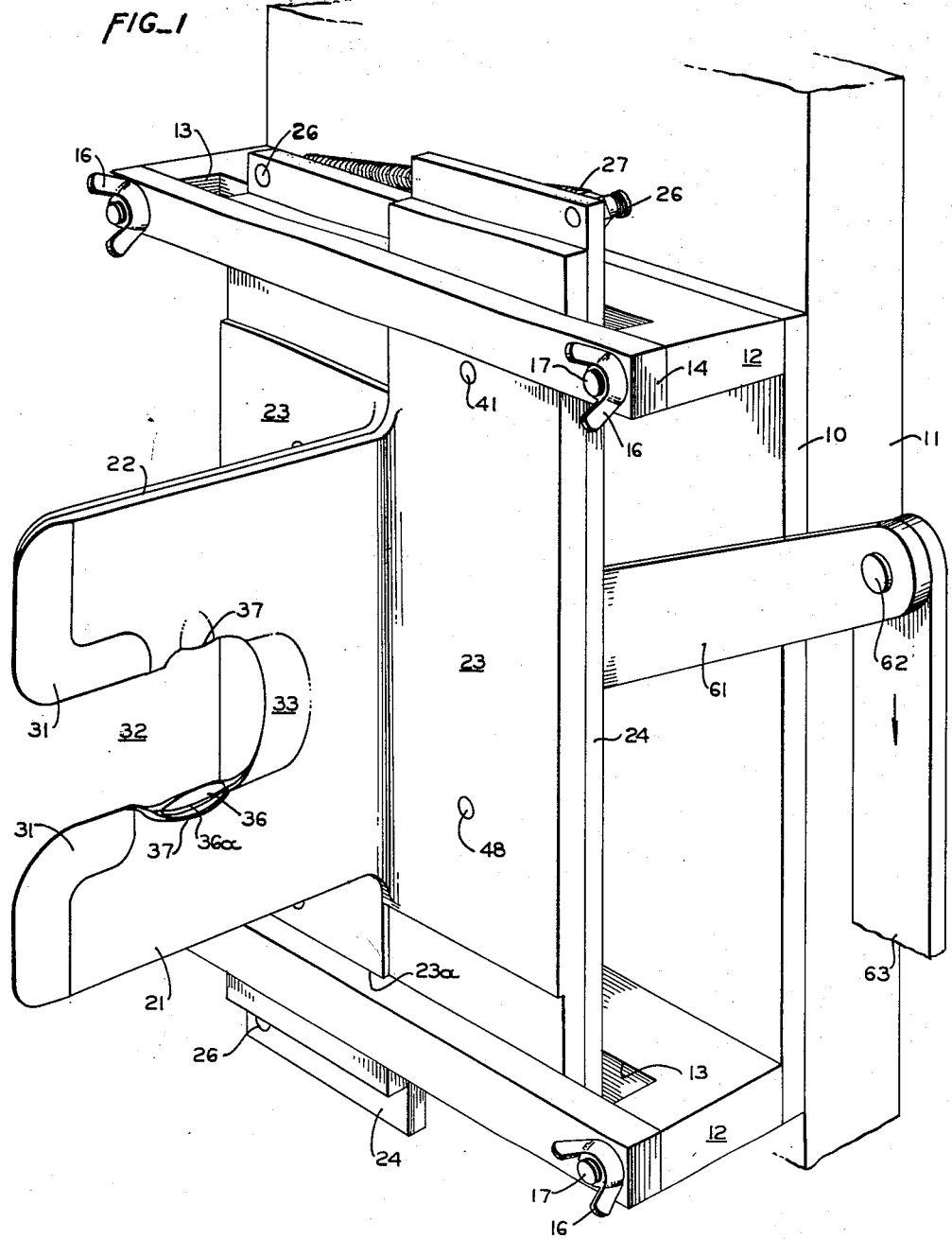

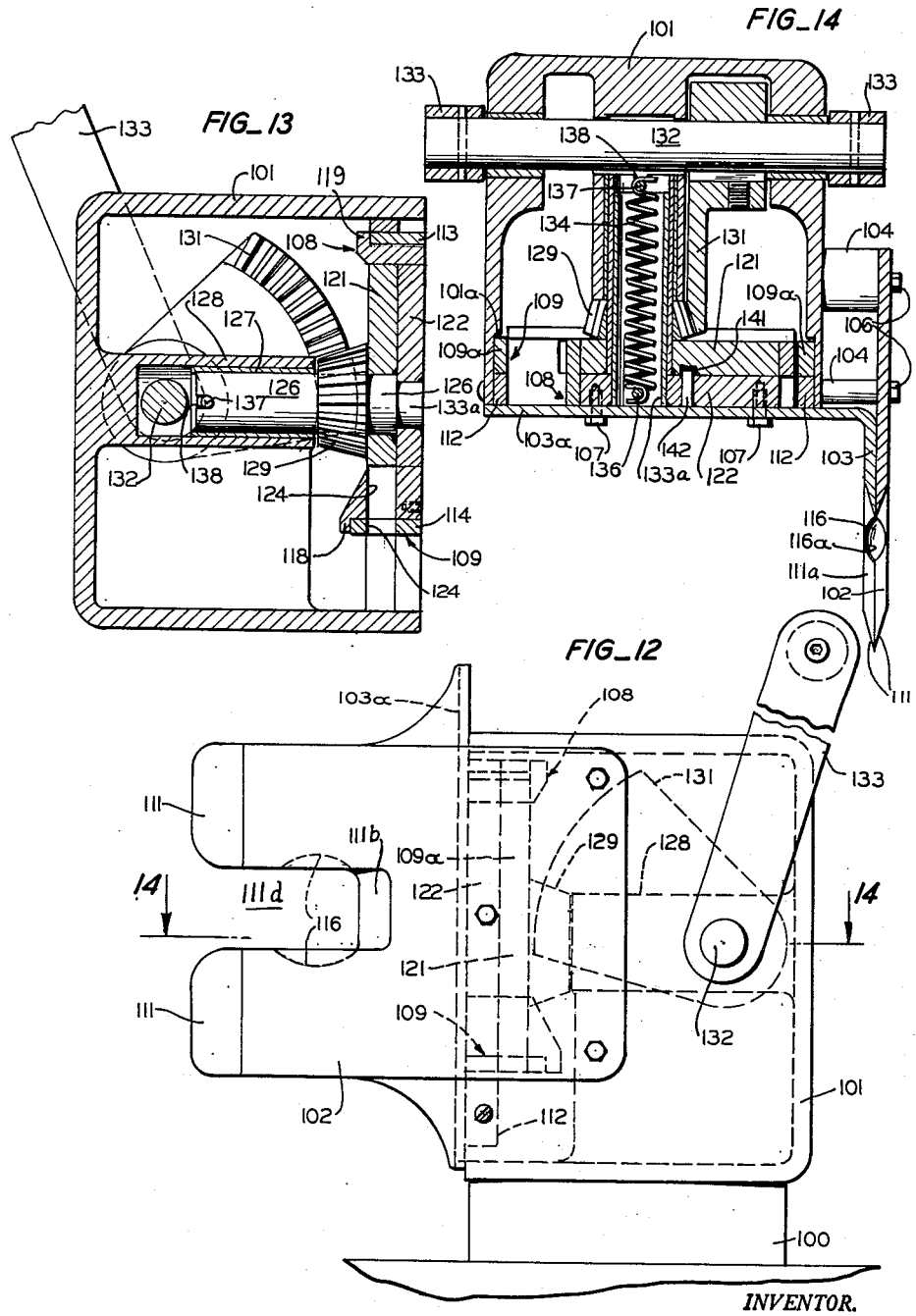

Dec. 10, 1963     E. R. ANDERSON     3,113,601
PITTING MACHINE
Filed March 20, 1959     7 Sheets-Sheet 6
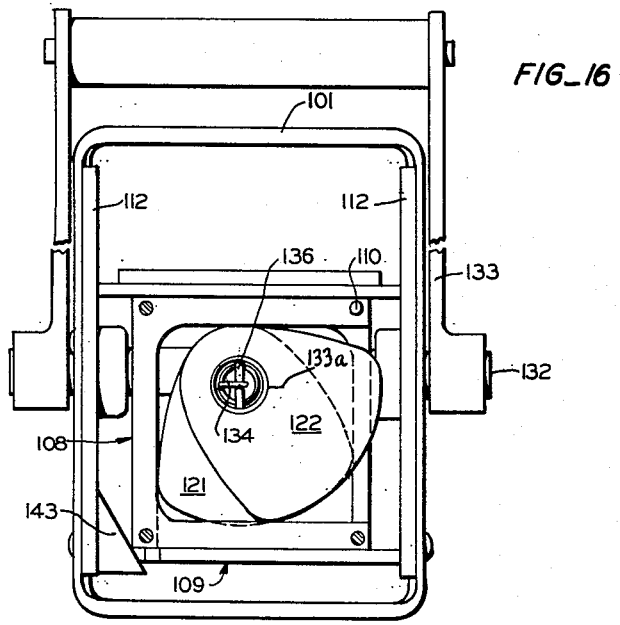
FIG_16
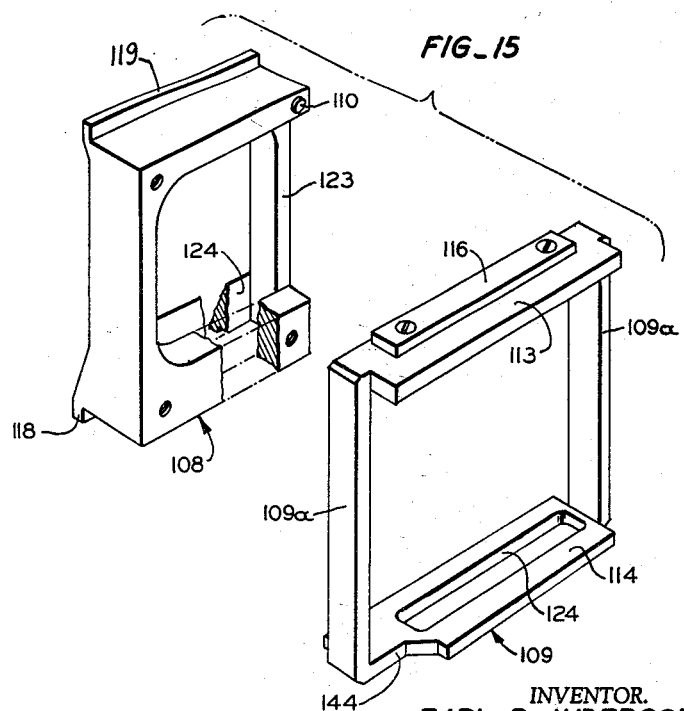
FIG_15
INVENTOR.
EARL R. ANDERSON
BY
*Allen and Chrony*
ATTORNEYS

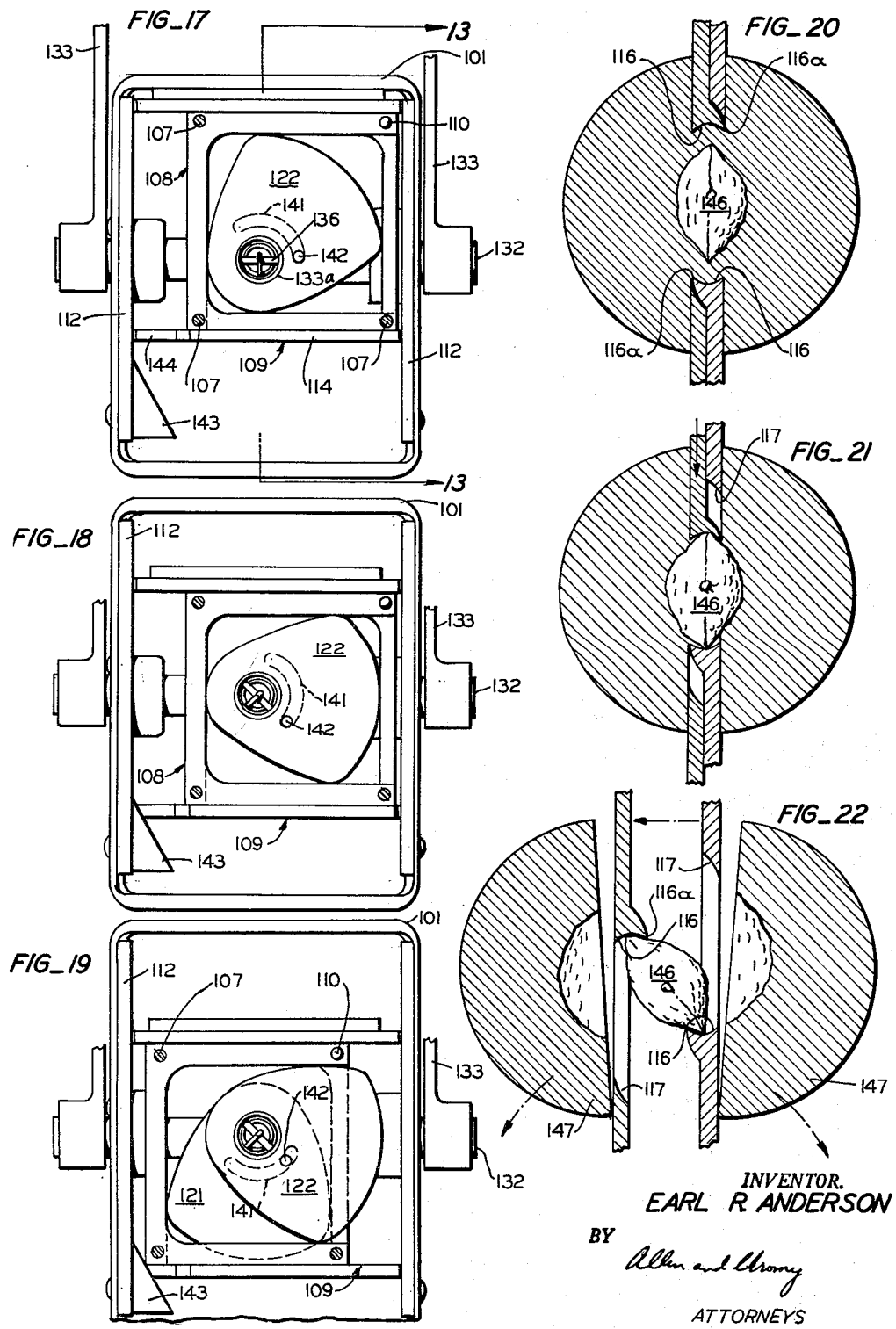

United States Patent Office 3,113,601
Patented Dec. 10, 1963

3,113,601
PITTING MACHINE
Earl R. Anderson, Campbell, Calif., assignor, by mesne assignments, to Filper Corporation
Filed Mar. 20, 1959, Ser. No. 800,696
15 Claims. (Cl. 146—28)

This application is a continuation-in-part of my copending application No. 572,692 filed March 20, 1956, now abandoned, and entitled "Pitting Machine and Method."

The present invention relates to that pitting of fruit articles such as prunes, apricots and peaches, and is concerned more particularly with a pitting operation of the above character in which the flesh of the fruit is severed into two halves, and each half fruit is separated from the pit of the fruit by a separation of the peach half with respect to the associated pit portion, accompanied by a holding and twisting action of the pit so that it is stripped from the pit cavity of each fruit half by a progressive separating action from one end or edge of the pit toward the other.

It is a general object of the invention to provide improved methods and apparatus for the pitting of drupaceous fruits, either as whole fruit, a half fruit containing a whole pit, or a half fruit containing a split pit.

Another object of the invention is to provide pitting apparatus including pitting blades mounted for movement in two directions at an angle to each other, the first movement effecting positive grasping of the pit, and the second movement providing for relative movement between the fruit halves or fruit half and the pit to effect the pitting operation.

A further object of the invention is to provide a pitting apparatus which accommodates itself readily to different sizes of pits.

Still another object of the invention is to provide pitting apparatus in which the fruit need not be oriented to effect the pitting operation.

Still another object of the invention is to provide a pitting apparatus wherein the respective pitting blades are effective to halve the fruit and grasp the pit of the fruit and then separate the halves from the pit to effect the pitting operation, and in which a stop is automatically adjusted to limit the degree of separating movement in accordance with the degree of travel of the blade or blades in engaging the pit, so that for a larger pit, i.e., a larger fruit, a greater separating movement is obtained and vice versa.

Other objects and advantages of the invention will be apparent from the following description of a preferred embodiment thereof, as illustrated in the accompanying drawings, in which:

FIGURE 1 is a perspective view of apparatus embodying the invention;

FIGURE 2 is an elevational view of the apparatus with certain parts broken away to clarify the construction;

FIGURE 3 is a sectional elevational view of the apparatus with the parts adjusted in the same position as in FIGURE 2 but showing a peach in relation to the pitting blades, the plane of the view being indicated by the line 3—3 in FIGURE 6.

FIGURE 4 is a view similar to FIGURE 2 but showing the parts as conditioned at the end of a pitting operation;

FIGURE 5 is a view similar to FIGURE 3 but showing the parts as conditioned at the end of a pitting operation;

FIGURE 6 is a sectional elevational view through the apparatus taken in planes indicated by the line 6—6 of FIGURE 2;

FIGURE 7 is an elevational view looking at the top of FIGURE 1;

FIGURE 8 is a perspective view of a pitting glove having a cup structure formed in the palm thereof;

FIGURE 9 is an operational view illustrating one method of inserting the fruit into the pitting mechanism;

FIGURE 10 is a perspective view showing the method of grasping and holding a fruit with reference to the pitting blades employing the pitting glove of FIGURE 8;

FIGURE 11 is an operational view illustrating the method of introducing the fruit into registry with the pitting blades;

FIGURES 12–21 illustrate another preferred machine for pitting fruit;

FIGURE 12 is a side elevational view of a pitting apparatus with certain parts shown in dotted lines;

FIGURE 13 is a vertical sectional view taken in a plane indicated by the line 13—13 in FIGURE 17;

FIGURE 14 is a horizontal sectional view taken in a plane indicated by the line 14—14 in FIGURE 12;

FIGURE 15 is an exploded perspective view illustrating the nested slide assembly;

FIGURE 16 is an operational view showing the position of the parts in a view similar to FIGURE 17 but in operated position with a fruit having a small pit;

FIGURE 17 is an elevational view of the housing showing operating cams and slide mechanism with the parts in home position ready for operation on a peach, the blade structure being omitted;

FIGURE 18 is a view similar to FIGURE 17 but showing the parts as positioned after the pit of the peach is engaged, but before any separating movement between the pit and the flesh has begun;

FIGURE 19 is a view similar to FIGURES 17 and 18 but showing the relation of the cams and slide mechanism at the end of the pitting operation;

FIGURE 20 is a sectional view through a peach and the pitting blades related thereto corresponding in position to the position of the parts shown in FIGURE 17;

FIGURE 21 is an operational view similar to FIGURE 20 but with the parts shown in the positions corresponding to those of FIGURE 18;

FIGURE 22 is a view generally similar to FIGURES 20 and 21 but showing the parts in the position corresponding to those of FIGURE 19.

Referring to FIGURES 1 through 5, the pitting apparatus of the instant invention includes a frame including a back plate 10 secured to a suitable support 11 and having a pair of end brackets 12 provided with a central recess 13. Each bracket supports a cross bar 14 which is held in place by suitable wing nuts 16 engaging threaded studs 17 which pass through the end brackets 12 and are secured in the back plate 10. The above frame provides a supporting means and a guide means for a pair of similar pitting blades 21 and 22 which project outwardly in adjacent parallel relation from base portions 23 thereof secured to movable support plates 24. At each end the respective support plates 24 have projecting studs 26 connected by a tension spring 27 by means of which the two blades 21 and 22 are urged yieldably to the side-by-side position shown in FIGURE 1. The end bars 14 provide stops for the respective end shoulders 23a of the base portions 23 of the respective pitting blades in their respective end positions.

The pitting means comprising the blades 21 and 22 include knife means for severing the flesh of the fruit in a desired plane, recess means permitting entry of the pit into the blade structure while the flesh of the fruit is being partially severed by the entering movement, and pit holding and grasping elements which can engage and grasp the pit irrespective of the angularity of the pit in its introduced position.

The knife means of each pitting blade includes an angle shaped cutting edge 31 formed on the outward edge of the blade at either side of a pit entry slot 32, and sharpened edge 33 formed at the rearward connecting portion of the blade. Intermediate one of the respective knife edge portions 31 and the knife edge portion 33 each blade is provided with a pit engaging cavity 36, the outline of this cavity being elongated and generally elliptical and V-shaped in transverse section. Knife edges 36a define the opening of each cavity 36. The cavity 36 of each blade is disposed in offset relation with respect to the blade and has its longitudinal center line lying in the plane of the inner side edge of the blade, the opposite blade being recessed at 37 to accommodate the extension of the cavity member. In this way it will be noted that the respective cavities 36 are in opposed relation in the position of the blades shown in FIGURE 1.

Each of the blades is provided with a floating mounting to accommodate closing movement of the blades so that the cavities 36 move toward each other to grasp the pit in a locked position. Subsequent separation of the blades in another direction of movement is effected, accompanied by a further approach to each other of the cavities, to effect simultaneously a translational separation of the fruit halves, and a twisting movement of a rotative movement of the fruit pit about its center to be twisted free from the fruit halves. The floating mounting means for each of the blades is connected to the mounting means of the other blade to provide a controlled simultaneous similar movement thereof. The invention contemplates movement of each of the blades with respect to the other, and it is obvious that this relative movement between the blades can be carried out with one blade fixed and the other movable in equally satisfactory fashion.

In order to control movement of the blades, each of the blades is provided with a pivot pin 41 which is connected by a link 42 to the pivot pin 43 on a bellcrank 44, which is pivotally mounted on the base plate 10 by a pivot pin 46 having its center axis lying in the same plane as the two adjustable surfaces of the blades 21 and 22. The bellcrank 44 is also pivoted to a link 47 having a pivotal connection 48 to the opposite base plate 24, and disposed in parallel relation to the link 42. Also the pair of bellcranks 44 are connected by link 49 for simultaneous movement.

Operating means are provided for effecting in sequence both the linear pit grasping movement of the blades 21 and 22, and then for effecting their separating movement, this operating means taking the form of a lever 61 pivotally connected at 62 to a suitable operating link 63 which may be connected to a foot pedal, for example. The lever 61 is pivotally mounted by pin 60 on the base 10 of the apparatus and carries on either side of its pivotal axis a pair of pivotally mounted blocks 64 engaging in the respective inclined slots 66 formed in the mounting plates 24. During the first movement of the lever 61 the operating block 64 acting against the inclined cam surfaces of the slots 66 are capable of imparting two components of movement to the base portions 23 and the blades 21 and 22. One component of movement, however, is resisted by the springs 27 so that initially the operating block 64 simply translates the blades 21 and 22 in a linear direction, to cause approach of the pit grasping and locking cavities 36 toward each other. However, when the blades encounter resistance, such as for example a pit, then the cam angle of the slots 66 in cooperation with the actuating blocks 64 of the lever 61 serves to impart the second component of movement to the blades to effect their separation and during this separating movement the cavities 36 continue to advance toward each other in their initial direction of travel while at the same time separating laterally to correspondingly separate the halves of the fruit. As viewed in FIGURE 5, the continued travel of the blades with respect to each other is represented by the offset position of the two peach halves, and their separation of course by the space between the blades 21 and 22. It will be noted that after the sockets or cavities 36 take their locking grip on the pit so as to hold it against rotational movement except that movement imparted to it by the blades themselves, that the pit is substantially rotated about an axis A, and the peach pit is stripped from the pit cavity from the stem end thereof and from the other pit cavity from the blossom end thereof.

Referring to FIGURES 8 through 10, cup means are provided for holding the peach halves or other fruit halves in relation to the blade structure, and preferably this cup means takes the form of a glove or glove-like article having in the palm thereof a cup structure of resilient material which may be either whole or segmental in character. An operator wearing two gloves can grasp the peach in both hands and enter it onto the pitting structure as illustrated in FIGURE 9 with the pit 70 between the two knife edges 31 of the blade members 21 and 22, which adjacent blade members form a wedge to effect separation of the fruit halves after cutting of the flesh thereof so as to pass cleanly over the edges of the cavities 36 without marking the flesh of the fruit. After the peach is entered with the pit between the cavities 36 as shown in FIGURE 11 it may be rotated to completely sever the flesh of the fruit into two halves. Alternatively it may be simply entered with the blades cutting into the suture line or the plane of the suture line of the fruit, and left with some flesh uncut. Subsequently the handle 61 is operated, and the socket or cavities caused to advance toward each other until the pit is grasped in a locking grip and held against undesired rotating movement, and then further movement of the cavities 36 toward each other is accompanied by a separating movement of the blades. During the separating movement, the pit forms a cross brace between the blades to prevent their collapsing or to resist collapsing toward each other.

During this movement, as previously stated the pit is stripped from the respective pit cavities in the fruit halves, and desirably the operator will rotate the two fruit halves slightly above different axes, the right hand fruit half in FIGURE 5 being rotated about a transverse axis B passing through the adjacent end of the fruit pit, and the left hand fruit half being rotated about a transverse axis C passing substantially through the lower end of the pit to assist slightly in freeing these ends of the pit from the flesh.

Preferably the operator would begin these rotative movements of the peach halves before they reach the position shown in FIGURE 5 so as to assist in freeing of the ends of the pit from the peach halves. The peach halves are then free to be removed, while the pit remains in its locked-in grip until the lever 61 is restored to separate the cavities or sockets 36.

While the operation of pitting has been described with reference to a freestone peach, for example, and with reference to aligning of the stone to place its ends in the sockets 36, the freestone peach or other fruit need not be definitely oriented with respect to the blades or the sockets unless such orientation is not desired in the fruit halves to be pitted. In other words, the knife edges 36a of the cavities will take the locking grip on an article such as a fruit pit in any position thereof to perform the pitting operation. With fruit such as prunes or dates having elongated pits it is preferred to place the pit in the transverse position with respect to the knives so that it will be gripped in a locking grip along the side thereof.

In the operation of feeding a peach or drupaceous fruit into the machine and the separation of the two fruit halves which accompanies this, the two blades 21 and 22 (FIGURE 7) in effect form a wedge so that the flesh of the fruit is distorted to substantially the dimensions of the sockets 36 so that these sockets 36 can be introduced between the fruit halves without objectionable scraping of the flesh of the fruit. If a peach is fed into the machine blossom end first, the knife edge formed by the surfaces 33 serves to cut into the fruit until the pit engages the sharpened edge as a stop when it will be located in the desired position between the sockets 36. If the fruit is fed in any other position it is also fed until the pit engages the edge of the sharpened surfaces 33 to obtain the proper location with respect to the sockets 36.

When the fruit is fed blossom end first so that it is severed by the cutting edges 33, no further rotation of the fruit is necessary before effecting pitting, and in the case of most freestone peaches no rotation of the fruit after impaling on the blades is necessary as only a partial cut in this type of fruit will produce a smooth severing of the flesh in the same plane beyond the blades.

Although reference has been made to a whole fruit containing a whole pit the invention can be employed with a half peach containing a whole pit or with a half peach containing a split pit, as in both of these instances the pit or pit portion can be introduced between the sockets 36 and the operating handle 61 employed to cause a locking grip on the pit or pit portion by these two sockets.

Referring particularly to FIGURES 12, 13 and 14, the modified form of peach pitter illustrated includes a base 100 upon which a housing or frame 101 is suitably mounted, and which provides a mounting for the relatively movable blades 102 and 103. The blade 102 (FIGURES 12 and 14) is secured at one side of the housing 101 by spacers 104 and cap screws 106. The blade 103 is formed angle-shaped, and the base 103a of this angle-shaped blade 103 is secured across the front open end of the housing 101 by cap screws 107 threaded into a slide 108 (referred to hereinafter) and by a locating dowel pin 110.

The pitting means comprising the blades 102 and 103 includes knife means for severing the flesh of the fruit in a desired plane, together with recess means permitting entry of the pit into a recess or slot of the blade structure while the flesh of the fruit is being partially severed and wedged apart during the entering movement, and pit holding and grasping elements which engage and grasp the pit in its introduced position.

The knife means of each pitting blade includes a cutting edge 111 (FIGURES 12 and 14) formed on the outside surface at the front end of the blade at either side of a pit entry slot 111a, and a cutting edge 111b at the end of the slot 112. Intermediate one of the knife edge portions 111 and the knife edge portion 111b, each blade is provided with a pit engaging cavity 116 (FIGURES 12, 14 and 20) the outline of this cavity being elongated and generally elliptical, and the cavity being V-shaped in transverse section. A knife edge 116a defines one side of each cavity 116. The cavity 116 of each blade is disposed in offset relation with respect to the blade and has its longitudinal center line lying in the plane of the inner side of the blade, the opposite blade being recessed at 117 to accommodate the extension of the cavity member. In this way it will be noted that the respective cavities 116 are in opposed relation in the position of the blades shown in FIGURES 12 and 20.

As previously explained, the blade 103 is provided with a floating movable mounting to provide for relative yielding closing movement of the blades so that the cavities 116 move toward each other to grasp the pit in a locked position irrespective of the size of the pit. Subsequent separation of the blades in another direction of movement is effected, accompanied by a separating action on the fruit halves from the pit so that the pit is stripped free from one edge of the pit cavity, while continuing to be held by the blade cavities. Because of the handling of different size pits, the closing movement of the blades or relative closing movement of the blades is effected during one sequence of operation of the operating means, and after a fixed amount of travel for this operation, other operating means comes into effect to cause separation of the blades to effect the pitting operation.

The floating yieldable mounting of the blade 103 to effect the relative closing movement of the blades is provided by a double slide structure including an inner slide 108 (FIGURES 14, 15 and 17) and an outer slide 109. The outer slide 109 has its side edge portions 109a (FIGURE 14) mounted for vertical sliding movement in respective vertical slots, each formed by an offset shoulder 101a of the adjacent side wall of the housing 101, and a fixed strip 112 suitably secured within the housing in spaced relation to the wall 111. The top wall 113 and the bottom wall 114 of the outer slide 109 provide guide strips for the inner slide 108, and the top wall 113 also carries an abutment strip 116 to limit the upper movement of the slide structure.

The inner slide 108 FIGURES 15 and 17) is provided with flanges 119 at the top and 118 at the bottom to engage behind respective top and bottom walls 113 and 114 of the outer slide 107, and the blade portion 103a is secured to the slide 108 so as to form retaining means with the flanges 119 and 118.

The double slide assembly is therefore mounted for vertical sliding movement within the housing 101, and the inner slide 108 is mounted for lateral sliding movement with respect to the slide 109.

In order to control this sliding movement a pair of operating cams 121 and 122 (FIGURES 13, 14 and 17) are provided within the slides 108 and 109, the slide 108 being cut away at 123 so that the cam 122 will be ineffective to produce any lateral movement of this slide, and both the inner and outer slides being slotted at 124 at the bottom so that the cam 121 registering with this slot has no effect on the vertical movement of the double slide structure but only upon the horizontal movement of the inner slide 108. The cam 121 (FIGURES 13 and 14) is secured on a sleeve 126 which is journaled in a bushing 127 in an internal centrally located boss 128 of the housing 101, and has thereon a beveled pinion 129 which meshes with and is driven by a bevel gear segment 131 secured on a transverse shaft 132 suitably journaled in bushings in the housing 101, and carrying at either end the respective arms of an operating handle 133.

The cam 122 for controlling vertical movement of the double slide assembly is secured on a sleeve 133a (FIGURE 14), which is journaled within the sleeve 126 and extends rearwardly therein. A resilient drive is provided for the sleeve 133a and the cam 122 in the form of a torsion spring 134 which is seated at one end about a transverse pin 136 in the sleeve 133a, and the other end about a pin 137 which has its ends mounted in end slots 138 of sleeve 126. By removing, twisting and re-seating the pin 137, the tension on the torsion spring 134 can be adjusted.

To provide for continued travel of the cam 121 after the cam 122 is stopped, a lost-motion connection is provided between the cams 121 and 122 and this takes the form of an arcuate recess or slot 141 in the cam 121 engaged by a pin 142 projecting from the cam 122. The slot is slightly under 180° in extent, extending for approximately 135° to allow full travel of the cam 121 with the cam 122, and, thereafter, to allow the cam 121 to travel without actuating the cam 122 after the movement of this latter cam has been interrupted. Upon the return of cam 121, the pin 142 will be picked up by the end of the slot 141 and the cam 122 will be returned to its home position as shown in FIGURE 17.

Automatically adjustable means are provided with respect to the transverse slide 108 and the casing 101 to limit the lateral transverse movement of the slide in accordance with the size of pit engaged between the blades, and this means takes the form of an inclined stop 143 secured within the housing 101 adjacent the lower portion thereof and adapted to be passed by a cut-away portion 144 of the slide 109, and disposed in front of the slide 108 after it has been moved downwardly in pit engaging position. It will be seen that if the slide 108 is stopped after a short time by a large pit, the lower edge or corner of this slide will be opposite the upper portion of the stop 143 so that a relatively large extent of lateral movement will be permitted, in separating the pit and stripping the fruit halves from the pit. However, if the slide structure has traveled farther in engaging a smaller pit, the amount of lateral movement permitted will be restricted. This enables the retaining of the pit as will be later described.

In operation, with a freestone peach for example, with the length of the pit aligned with the length of the slot 111a, and with the plane of the blades 102 and 103 aligned substantially with the suture plane of the peach, the peach is entered, blossom end first, onto the blade structure with the blade structure in its upper position as shown in FIGURES 17 and 20, until the pit engages the knife edge 111b. The blades 102 and 103 in effect performing a cutting and wedging operation to separate the two halves of the flesh from each other, and to place a strain on the adjacent portions of the flesh where it is attached to the pit. The cutting edge 111b cuts the flesh at the blossom end of the fruit. This places the pit between the cavities 116 and is followed by operation of the handle 133. When the handle 133 is operated, the double slide structure 108–109 moves downwardly together under the influence of the cam 122 on the slide 108, the cam 121 moving idly at this time. When the two opposed pit engaging cavities 116 have engaged the opposite side edges of the pit as shown in FIGURE 1, the downward movement of the slide structure 108—109 is interrupted, the spring 134 yielding during further turning movement of the cam 121 and its sleeve 126. This relative movement between the cams 121 and 122 is permitted by the arcuate recess 141 and the pin 142 moving idly in its recess away from the position shown in FIGURE 17. Subsequently, the cam 121 comes into operation as shown in FIGURE 19 against the side wall of the slide 108, and moves this slide laterally with respect to the slide 109 at the same time moving the blade 103 away from the blade 102 as illustrated in FIGURE 22, twisting the pit free from the two half cavities of the fruit halves. It will also be noted that the pit 146 is still maintained grasped by the cavities 116 while the fruit halves 147 are free to fall or be removed from the blades.

A return movement of the handle 133 reverses the operation of parts, freeing the pit 146 so that it can be removed. During this operation the cam 121 picks up and returns the cam 122 to its starting position.

While I have shown and described certain preferred methods and forms of the invention, it is apparent that both methods described and the forms shown are capable of variation and modification so that their scope should be limited only by the scope of the claims appended hereto.

I claim:

1. In a pitting apparatus for drupaceous fruit, a pair of blades disposed in side by side abutting relation to provide adjacent inner faces and respective outer faces and having sharpened edges facing in the same direction and forming together an entering wedge for simultaneously penetrating the fruit, a pair of pit gripping elements on said blades for engaging a pit therebetween in a locking grip, means for effecting relative closing movement of said blades to effect said locking grip and thereafter for moving said blades to effect a separation thereof.

2. In a pitting apparatus for drupaceous fruit, a pair of blades disposed in side by side relation to provide adjacent inner faces and respective outer faces and each having a slotted portion in registry with each other for entry of the fruit therein, the slots of said slotted portions opening in the same direction, a pair of pit gripping elements for engaging a pit therebetween in a locking grip, means for effecting closing movement of said pit gripping elements to effect a locking grip on the pit, and means operable for moving said blades to effect a separation of each side of the pit from the associated fruit portion.

3. In a pitting apparatus for drupaceous fruit, a pair of blades disposed in side by side relation to provide adjacent inner faces and respective outer faces and having registering slots facing in the same direction for entry of a fruit into co-operative relation therewith, each of said blades having at least one knife edge for gripping of the pit in response to approaching movement of said blades, and means for effecting separation of said blades in response to engagement of said knife edges with a fruit pit.

4. In an apparatus for pitting drupaceous fruits, a frame, a pair of blades mounted for rotative movement in two directions on said frame and normally disposed in side by side relation to provide adjacent inner faces and respective outer faces, each of said blades having a pit receiving recess extending inwardly from an edge thereof, said recesses coinciding in said normal position of the blades and extending inwardly into the blades, said blades being sharpened on said outer faces so as to form together a cutting edge of L-shaped contour at each side of said recesses and to provide for impaling of a fruit on said blades, a socket formed in each blade with one-half of the socket offset in the direction of the other blade so that the centers of said sockets lie in a plane containing the adjacent faces of said blades in said normal position and said sockets facing each other in one direction of movement of the blades, means for first effecting linear approaching movement of the blades and said sockets in said one direction to engage the pit of a fruit impaled on said blades and to effect a locking grip on the pit by said sockets, and means brought into play after engagement of a pit by the sockets for effecting a separating movement of the blades accompanied by a further approach to each other of said sockets in said one direction of movement as the pit rotates, to effect a stripping movement of the pit from the cavity of each fruit half.

5. In an apparatus for pitting drupaceous fruits, a frame, a pair of blades mounted for movement in two directions on said frame and normally disposed in side by side relation, each of said blades having a pit receiving recess extending inwardly from an edge thereof, said recesses coinciding in said normal position of the blades, said blades being sharpened on opposite faces so as to form together a cutting edge, a socket formed in each blade and said sockets facing each other in one direction of movement of the blades, means for first effecting a linear approaching movement of the blades and said sockets in said one direction to engage the pit of a fruit impaled on said blades and to effect a locking grip on the pit by said sockets, and means brought into play after engagement of a pit by the sockets for effecting a separating movement of the blades accompanied by a further approach to each other of said sockets in said one direction of movement as the pit rotates to effect a stripping movement of the pit from the cavity of each fruit half.

6. In an apparatus for pitting drupaceous fruits, a frame, a pair of blades mounted for movement in two directions on said frame and normally disposed in side-by-side relation to provide adjacent inner faces and respective outer faces, each of said blades having a pit receiving recess, said recesses coinciding in said normal position of the blades, a socket on each blade defined by knife edges and said sockets facing each other in one direction of movement of the blades, means for first effecting a linear approaching movement of the blades and said sockets to engage the pit of a fruit impaled on said blades and to effect a locking grip on the pit by said sockets, and means brought into play after engagement of a pit by the sockets for effecting a separating movement of the blades accompanied by a further approach to each other of said sockets in said one direction of movement as the pit rotates to effect a stripping movement of the pit from the cavity of each fruit half.

7. In a pitting apparatus as recited in claim 4 in which said movement effectuating means includes parallel motion linkage connections between each of said blades with each other and with said frame, said movement effecting means also including an inclined cam slot in each of said blades and an operating element cooperating with said cam slots to effect the movement of said blades, and means for yieldably resisting the separating movement of said blades, whereby the initial operation of said operating elements effects a sliding linear movement of said blades to provide for approach of said sockets and upon engagement of a pit between said sockets and yieldable means yields to permit separating movement of said blades.

8. In an apparatus for pitting drupaceous fruit, a frame, a pair of blades mounted for relative movement in two directions on said frame and normally disposed in side-by-side relation with respective inner abutting faces and respective outer faces, each of said blades having a knife edge and a pit receiving recess extending inwardly from said knife edge, said recesses coinciding in said normal position of the blades and providing a pit receiving slot, a socket or cavity in each blade facing the socket of the other blade, cam means for first effecting relative approaching movement of the blades in one of said directions to engage said socket with the pit of a fruit engaged on said blades and to effect a locking grip on the pit by said sockets, and second cam means brought into play after engagement of a pit by the sockets for effecting a separating movement of the blades to effect a stripping movement of the pit from the cavity of each fruit half from adjacent an edge of the cavity.

9. In an apparatus for pitting drupaceous fruits, a frame, a pair of blades mounted for relative movement in two directions on said frame and normally disposed in side-by-side relation with respective inner abutting faces and respective outer faces, said two directions of relative movement including approaching movement in a first direction to grip a pit and separating movement in a second direction to separate the pit from the flesh of the two fruit halves, each of said blades having a pit receiving recess extending inwardly from a knife edge, said recesses coinciding in said normal position of the blades and providing a pit receiving slot, a socket or cavity in each blade along one side of said recess facing the similar socket of the other blade and facing in a direction at right angles to the direction of entering movement of the fruit onto the blades, means for effecting said relative blade movement in said two directions successively comprising a slide structure including a first slide mounted for movement in one of said two directions on said frame and a second slide carried by said first slide for movement therewith in said first direction and mounted for movement with respect thereto in the second of said two directions, a pair of cams engaged with said slide structure and normally disposed in synchronism with respect to each other, said slide structure being cut away with respect to one of said cams in said first direction of movement whereby said other cam is effective to cause relative movement of said blades in said first direction to grip a pit, and said second slide being cut away with respect to the other of said cams in said second direction of movement whereby said one cam is effective to cause relative movement of said blades in said second direction to separate a pit from the fruit halves, yieldable driving connection from said one cam to said other cam, and means for driving said one cam.

10. In an apparatus for pitting drupaceous fruits, a frame, a pair of blades mounted for relative movement in two directions on said frame and normally disposed in side-by-side relation with respective inner abutting faces and respective outer faces, said two directions of relative movement including approaching movement in a first direction to grip a pit and separating movement in a second direction to separate the pit from the flesh of the two fruit halves, each of said blades having a pit receiving recess extending inwardly from a knife edge, said recesses coinciding in said normal position of the blades and providing a pit receiving slot, a socket or cavity in each blade along one side of said recess facing the similar socket of the other blade and facing in a direction at right angles to the direction of entering movement of the fruit onto the blades, means for effecting said relative blade movement in said two directions successively comprising a slide structure including a first slide mounted for movement in one of said two directions on said frame and a second slide carried by said first slide for movement therewith in said first direction and mounted for movement with respect thereto in the second of said two directions, cam means engaged with said slide structure to first cause relative movement of said blades in said first direction to grip a pit and thereafter to cause relative movement of said blades in said second direction to separate a pit from the fruit halves, and means for driving said cam means.

11. In an apparatus as recited in claim 10, including an inclined stop mounted on said frame in position to be engaged by said second slide while moving in said second direction.

12. In an apparatus for pitting drupaceous fruits, a frame, a pair of blades mounted for relative movement in two directions on said frame and normally disposed in side-by-side relation with respective inner abutting faces and respective outer faces, said two directions of relative movement including approaching movement in a first direction to grip a pit and separating movement in a second direction to separate the pit from the flesh of the two fruit halves, each of said blades having a pit receiving recess extending inwardly from a knife edge, said recesses coinciding in said normal position of the blades and providing a pit receiving slot, said slots opening in the same direction, a socket or cavity in each blade along one side of said recess facing the similar socket of the other blade and facing in a direction at right angles to the direction of entering movement of the fruit onto the blades, means for controlling said relative blade movement in said two directions successively comprising means to first cause relative movement of said blades in said first direction to grip a pit and thereafter to cause relative movement of said blades in said second direction to separate a pit from the fruit halves.

13. In an apparatus as set forth in claim 12 and means controlled by the extent of movement in said first direction to vary the extent of movement in said second direction.

14. In an apparatus for pitting drupaceous fruits, a frame, a pair of blades mounted for relative movement in two directions on said frame and normally disposed in side-by-side relation with respective inner abutting faces and respective outer faces, said two directions of relative movement including approaching movement in a first direction to grip a pit and separating movement in a second direction to separate the pit from the flesh of the two fruit halves, each of said blades having a pit receiving recess extending inwardly from a knife edge, said recesses coinciding in said normal position of the blades and providing a pit receiving slot, a socket or cavity in each blade along one side of said recess facing the similar socket of the other blade and facing in a direction at right angles to the direction of entering movement of the fruit onto the blades, means for effecting said relative blade movement in said two directions successively comprising a slide structure including a first slide mounted for movement in one of said two directions on said frame and a second slide carried by said first slide for movement therewith in said first direction and mounted for movement with respect thereto in the second of said two directions, cam means engaged with said slide structure to first cause relative movement of said blades in said first direction to grip a pit and thereafter to cause relative movement of said blades in said second direction to separate a pit from the fruit halves, means for driving said cam means to effect said movement in said two directions and also to return said cam and said slide structure to their starting positions.

15. In a pitting apparatus for drupaceous fruit, a pair of blades disposed in side by side relation to provide adjacent inner faces and respective outer faces and having registering slots for entry of a fruit into cooperative relation therewith, said slots opening in the same direction to receive the fruit, each of said blades having means for gripping the pit in response to approaching movement of said blades, said gripping means comprising an elongated cavity for receiving and housing an end or edge of the pit and providing an aligning action on the pit, means for effecting separation of said blades after engagement of said knife edges with a fruit pit, and means for controlling the amount of separation of said blades in accordance with the size of the pit engaged therewith.

References Cited in the file of this patent

UNITED STATES PATENTS

| | | |
|---|---|---|
| 1,056,965 | Baltzley | Mar. 25, 1913 |
| 1,403,852 | Ensele | Jan. 17, 1922 |
| 1,755,872 | Gotelli | Apr. 22, 1930 |
| 2,652,085 | Ansley | Sept. 15, 1953 |
| 2,704,561 | Thompson | Mar. 22, 1955 |
| 2,818,098 | Perrelli | Dec. 31, 1957 |
| 2,903,031 | Anderson | Sept. 8, 1959 |